United States Patent

Wuerker

[15] 3,701,957
[45] Oct. 31, 1972

[54] COHERENCE CONTROLLED RUBY LASER

[72] Inventor: Ralph F. Wuerker, Palos Verdes Estates, Calif.

[73] Assignee: TRW Inc., Redondo Beach, Calif.

[22] Filed: Oct. 12, 1971

[21] Appl. No.: 188,150

[52] U.S. Cl. ............................................... 331/94.5
[51] Int. Cl. ............................................... H01s 3/10
[58] Field of Search .................. 331/94.5; 350/160

[56] References Cited

UNITED STATES PATENTS 3,414,836   12/1968   Clark et al. ............... 331/94.5
3,493,885    2/1970   Sorokin ..................... 331/94.5

*Primary Examiner*—William L. Sikes
*Attorney*—Daniel T. Anderson et al.

[57] ABSTRACT

A pulsed ruby laser is caused to oscillate substantially in a single mode to increase its coherence length. This is accomplished by the provision of one or more dye cells containing chlorophyll $d$ as a saturable absorber for the laser radiation. The dye cell has a length of no less than one-quarter and no more than two-thirds that of the optical laser cavity and preferably has a length of approximately one-half that of the cavity. Due to the provision of such a long chlorophyll $d$ dye cell the initial mode of oscillation of the laser is favored, and the dye cell discriminates to a substantial extent against all other oscillating modes. This longitudinal mode control improves the temporal or longitudinal coherence of the laser. The chlorophyll $d$ operating as a saturable absorber preferably is in a solvent transparent to the ruby radiation and having a high viscosity to minimize the effects of Brownian motion.

6 Claims, 2 Drawing Figures

PATENTED OCT 31 1972　　　　　　　　　　　　　　3,701,957

Ralph F. Wuerker
INVENTOR.

BY　*Edw. A. Osen.*

ATTORNEY

COHERENCE CONTROLLED RUBY LASER

CROSS REFERENCE TO RELATED APPLICATION

The present application is related to a copending application to Lee O. Heflinger filed June 23, 1971, and entitled "Pulsed Lasers Having Improved Coherence Control" Ser. No. 155,729 (70-426) and assigned to the assignee of the present application. This copending Heflinger application discloses a long dye cell for controlling the modes of a pulsed laser.

BACKGROUND OF THE INVENTION

This invention relates generally to pulsed ruby lasers, and particularly relates to an improved longitudinal mode control for a ruby laser to improve its coherence length.

It has long been recognized in the art that the coherence length of pulsed ruby lasers is severely limited. Many attempts have accordingly been made in the past to improve the temporal or longitudinal coherence of a pulsed ruby laser. This would permit to utilize a pulsed ruby laser with its inherent advantage of a much greater light intensity over that of other lasers.

Thus, the very high light output of a pulsed ruby laser makes it possible to record holograms in a time period on the order of micro-seconds or even shorter.

Due to the low light output of most gas lasers it is impossible to take holograms in such short periods of time. This is of great importance because in order to obtain a good holographic recording it is necessary that the object remain stationary within a fraction of a wave-length during the time of exposure.

Various mode controls have been developed to improve the coherence length of a pulsed ruby laser. These include, for example, the resonant cavity of the laser and various optical resonators, such for example, as a Fabry-Perot interferometer. It has also been proposed to utilize a dye cell for this purpose, the dye cell containing a saturable absorber. Thus, the dye may be a photochromatic material which normally absorbs the wavelength of the optical radiation generated by the laser but can be bleached by the light of the laser so that the dye cell then transmits the optical radiation. This bleaching process is caused because the molecules of the absorber absorb the laser light and are thereby excited to an upper state in which the molecule is transparent to the laser light.

In general it is believed that a saturable absorber or dye cell operates as follows: When the laser starts to lase, a standing light wave is set up in the optical cavity. Usually the optical cavity is formed by two reflectors, one of which reflects all of the light while the other permits a portion of the light to pass out of the cavity. Accordingly, the resonant optical wave is a standing wave between the 100% light reflector and the ruby rod while in the region between the ruby rod and the output reflector there is a combination of travelling and standing waves. In any case, the standing light wave will bleach the saturable absorber at the antinodes of the wave. This will then, in a manner of speaking, lock in the initial mode which has been set up and discriminate to a certain extent against other modes.

However, it has been found that while such a dye cell improves the temporal coherence of the laser, the improvement is not as great as should be desired. It should also be emphasized that prior art dye cells are relatively short and extend only through a small fraction of the length of the optical cavity.

It has also been proposed in the past to use natural chlorophyll d for Q-switching a ruby laser. Thus, the Q-switching of ruby lasers by chlorophyll has been proposed by Yoshino, Iguchi, Kawabe and Inuishi in a paper published in the Journal of the Physical Society of Japan, Volume 25, page 294, 1968. Chlorophyll $d$ has also been proposed for this purpose by Yoshino, Iguchi, Kawabe and Inuishi in a paper published in the Technology Reports of the Osaka University, Volume 18, pages 437 – 442, 1968. In this connection reference is made to a paper by Yoshino Kawabe and Inuishi which appears in Technology Reports of the Osaka University, Volume 19, pages 131 – 136, 1969 and a paper by Yoshino, Kawabe and Inushi published in the Japanese Journal of Applied Physics, Volume 8, pages 1168 – 1169, 1969. While these papers suggest the use of chlorophyll and its derivatives, such as chlorophyll $d$, for Q-switching of a laser, they do not suggest that mode control may be obtained by the use of chlorophyll $d$.

It is therefore an object of the present invention to provide a pulsed ruby laser with improved coherence control by the use of a saturable absorber having a narrow line width, having an absorption which coincides with the laser line of the ruby laser and having a memory on the order of a microsecond or more.

A further object of the present invention is to provide a pulsed ruby laser with a long dye cell including chlorophyll $d$ as a saturable absorber to cause the laser to oscillate substantially in a single mode.

SUMMARY OF THE INVENTION

A pulsed ruby laser in accordance with the present invention has a longitudinal mode control to improve its coherence length. Such a laser comprises a ruby rod and means for pumping the ruby rod to develop an optical radiation. A first and a second reflector are provided for reflecting the optical radiation. These reflectors define an optical, resonant cavity and enclose the ruby rod. The first reflector reflects substantially all of the optical radiation while the reflector reflects only a portion of the optical radiation while transmitting the remainder thereof.

Finally, in accordance with the present invention there is provided one or more dye cells disposed in the cavity and transparent to the optical radiation. The dye cell or cells contains chlorophyll d operating as a saturable absorber and has a combined length of no less than one-quarter of that of the resonant cavity but may be as long as two-thirds of that of the cavity.

Preferably, the chlorophyll $d$ is dissolved in a solvent transparent to the optical radiation and having a high viscosity to minimize the effects of Brownian motion, such as mineral oil.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
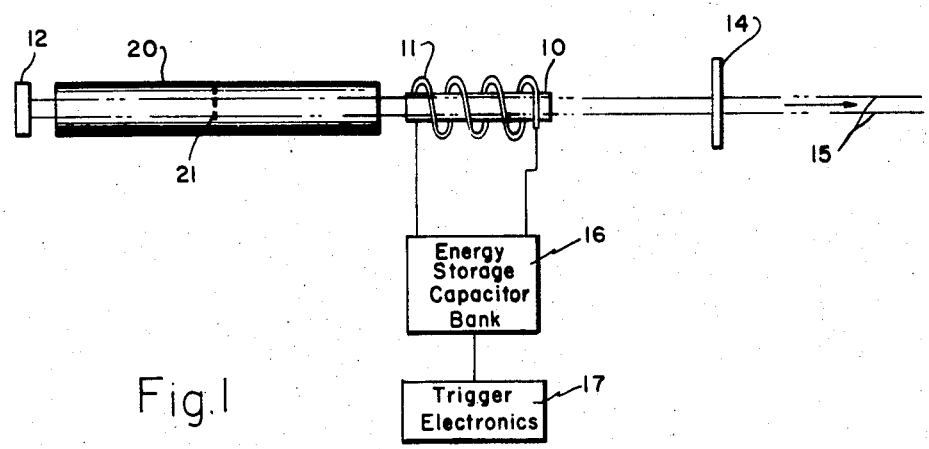
FIG. 1 is a schematic representation of a pulsed ruby laser embodying a dye cell containing chlorophyll $d$ in accordance with the present invention and including in block form the electronics for triggering the laser.

Referring now to the drawings, and particularly to FIG. 1, there is illustrated a pulsed ruby laser embodying the present invention. The laser includes ruby rod 10 which may be provided with a suitable means of pumping the ruby into an upper excited state. To this end there is conventionally provided a flash lamp 11 which optically excites the ruby rod 10. The ruby rod 10 is disposed in an optical and resonant cavity formed by a first reflector 12 and by a second or output reflector 14. The reflector 12 may consist of any suitable material such as a mirror with a dielectric coating which reflects substantially all of the optical radiation generated by the laser. The output reflector 14 is so arranged that it reflects only a portion of the optical radiation and permits the remainder of the radiation to leave the optical cavity to provide an output beam 15. Thus, the output reflector 14 may have a suitable dielectric coating and may, by way of example, have a reflectivity on the order of 55 percent. Alternatively, the output reflector may consist of a multiple surface reflector such as a plate of sapphire and known as a resonant reflector or Fabry-Perot interferometer.

The flash lamp 11 may be supplied in a conventional manner with electrical energy by an energy storage capacitor bank shown schematically by a block 16. There may also be provided an electronic trigger such as shown by the block 17 for triggering the capacitor bank 16, thereby to initiate operation of the flash lamp 11. This in turn will start the pumping of the laser into an upper excited level to provide an inverted population and at some predetermined time later the laser will then issue a light pulse.

The laser of FIG. 1 as described so far is entirely conventional. The laser is pulsed to issue a light pulse some time after the occurrence of the trigger developed by the trigger electronics 17. It will be appreciated that there may be a certain amount of jitter meaning that there is a time delay of variable duration between the instant when the flash lamp is first ignited and the instant when the laser pulse appears. If it is desired to issue a laser pulse at an exactly known time it may be desired to utilize an electronic Q-switch in addition to a dye cell.

Further, there is provided a dye cell 20 within the optical cavity defined by reflectors 12 and 14. This dye cell 20 should, of course, be initially partly transparent to the optical radiation of the laser. It has a length of no less than ¼ the length of the optical cavity and of no more than ⅗ of the length of the cavity. Preferably, its length is approximately ½ the length of the cavity.

It has also been found experimentally and proven by mathematical theory as fully explained in the copending Heflinger application above referred to that the position of the dye cell is of importance. As indicated before, an optical standing wave is set up in the space between the reflector 12 and the ruby rod 10. On the other hand, in the space between the ruby rod 10 and the output reflector 14 there usually exists not only a standing optical wave, but a travelling wave, which of course is the output wave. The significance of this will be subsequently explained.

In accordance with the present invention the dye cell 20 is filled with chlorophyll d operating as a saturable absorber for the optical radiation generated by the laser. Chlorophyll d has the empirical formula $C_{54}H_{70}O_6N_4Mg$. The structural formula of chlorophyll $d$ is as follows:

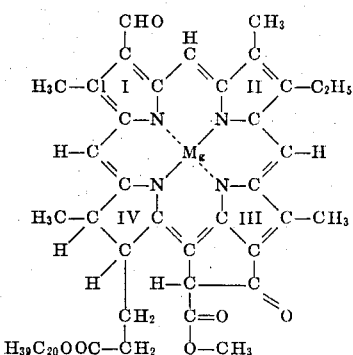

This formula is in accordance with that shown in the papers previously referred to.

The preparation of the chlorophylls and particularly of chlorophyll $d$ is described in the literature, for example, in the book "The Chlorophylls" by Vernon and Seely published by the Academic Press, New York and London, 1966; also, in a paper by Strain entitled "Chloroplast Pigments and Chromatographic Analysis," Thirty-Second Annual Priestly Lectures, The Pennsylvania State University, University Park, Pennsylvania, March 1958; also in the chapter of the book "The Chlorophylls" above referred to, the chapter being authored by Strain and Svec entitled "Extraction, Separation, Estimation, and Isolation of the Chlorophylls," pages 21 to 66. In this connection see also the book entitled "Chemistry and Biochemistry of Plant Pigments" by Goodwin, Editor, Academic Press, New York, 1965 and particularly chapter 17 pages 461 to 488 by Margaret Holden entitled "Chlorophylls."d It has been found that chlorophyll may, for example, be extracted from spinach leaves. Basically the leaves are mechanically stirred to form a solution and filtered through a chromograph column to obtain a solution of chlorophylls. The chlorophyll a component may subsequently be converted chemically by oxidation with potassium permanganate into chlorophyll $d$. It should also be noted that chlorophyll $d$ is directly produced by certain algae of the ocean. Among these are the red algae Rhodochorton Rothie from Half Moon Bay near San Francisco, California which contains chlorophyll $d$. Also, it has been extracted from Gigartina Papillata collected from Moss Beach, San Mateo County, California.

It turns out that chlorophyll d has some very desirable properties as a dye cell or saturable absorber for a ruby laser. The linewidth of chlorophyll d is narrow and it is substantially in resonance with the ruby line. The red ruby line during lasing is at 6,943 angstrom units (A) while the absorption peak of chlorophyll d in mineral oil is approximately 6,940 A. A saturable absorber such as chlorophyll d operates like an harmonic oscillator. In other words the length of the memory of the absorber depends inversely on the linewidth. The smaller the linewidth the longer the memory, that is the longer the absorber remains in a bleached state. Thus, for chlorophyll d the memory or the lifetime of the bleached or inverted stage is on the order of a microsecond or more.

All of these properties are of extreme importance for the dye cell 20 in accordance with the present invention.

It may also be noted that since cryptocyanine has a much broader resonance it also has a shorter memory, that is a shorter half lifetime of the excited molecules.

The results of the work done with a ruby laser having a long dye cell with chlorophyll d has been reported in a paper which appears in the Journal of the Society of Photooptical Instrumentation Engineers, Volume 9, April – May 1971 on pages 122 to 130 by Wuerker and Heflinger. This paper is a review paper and contains, among others, the results of the work on which the present invention is based.

It should be emphasized here that instead of a single dye cell 20, two or more dye cells of the same length as cell 20 may also be used.

A simple explanation of the operation of the dye cell 20 is as follows.

Initially, the dye is nearly opaque to the radiation of the laser. Consequently, it increases the loss of the laser so that the laser will not be able to oscillate during the initial portion of the pump period. However, as the pumping proceeds and as the gain of the laser rod 10 thereby increases, eventually the overall laser gain exceeds the loss and lasing begins. As the oscillation within the optical cavity builds up the molecules of the chlorophyll d which absorb the light are excited or raised to their upper state due to the absorption of light. Each dye molecule extracts a quantum of energy. Therefore, the number of chlorophyll d molecules available which are still capable of absorbing light diminishes. As a result, the cavity loss decreases which now permits a very rapid buildup of oscillation. This continues at a high level until the excited molecules of the laser rod have been depleted whereupon oscillation stops.

The important point in accordance with the present invention is the precise physical location of the chlorophyll d molecules which have been bleached or excited so as to become transparent. Another important aspect of this is the time duration during which an excited dye molecules, which has previously absorbed a light photon, remains in its upper state. Preferably, the excited dye molecule has a lifetime which is on the order of the duration of the laser pulse. This lifetime depends not only on the dye but also to a certain degree on the solvent used for the dye.

As indicated before as shown in FIG. 1, the dye cell 20 preferably has a length of approximately ½ that of the optical cavity. It is preferably disposed between the reflector 12 and the ruby rod 10 because in this region the standing wave pattern is the most complete. Accordingly, the saturable absorber is bleached at the antinodal points of the standing optical wave. If the dye cell is disposed between the ruby rod 10 and the output reflector 14 the travelling wave in turn will tend to effect some bleaching of the saturable absorber even at the nodes of the standing wave component. Therefore, the cell will be somewhat less effective in discriminating against undesirable modes.

Thus, it has been found that a ruby laser in accordance with FIG. 1 has a coherence length of no less than 10 meters, the limit being given by the size of the room in which the laser was operated to obtain holograms. This indicates that the laser was essentially oscillating in a single mode. Generally, the mode of a laser tends to change while it is lasing or else many modes oscillate simultaneously. This is due to the fact that the index of refraction of the ruby changes with temperature or the fact that the given region of the laser is not narrow but relatively wide, that is on the order of ¼ A, and therefore changes during the lasing. However, with a long dye cell in accordance with the invention, the mode becomes locked by the dye cell because it tends to discriminate against other unwanted modes.

When the laser of FIG. 1 lases, a standing wave of the optical radiation is set up not only in the space between the reflector 12 and the ruby rod 10, but also in the ruby rod itself. Accordingly, the excited, inverted molecules are depleted principally at the antinodes formed within the ruby rod 10. This, of course, eventually decreases the gain for the initial mode. On the other hand, it leaves the gain high for any other mode with its antinodes located approximately where the original nodes were. Therefore, it will be appreciated that the ruby rod 10 acts in a manner opposite to the function of the dye cell 20 and tends to cause mode shifting.

It can be shown theoretically that if the duration of the laser pulse is on the order of a microsecond or more, the bleached or excited molecules will migrate away from the antinoidal planes due to Brownian movement. This may be inhibited to a certain extent by selecting a solvent having a high viscosity. This is only necessary where the pulse duration is so long that the dye molecules will migrate over at least a fraction of a wavelength during the duration of the pulse. Such a high viscosity solvent may simply consist of a high viscosity mineral oil transparent to the radiation of the laser.

Thus, preferably the chlorophyll d of the dye cell 20 is contained in a viscous medium which is, of course, transparent to the ruby radiation. Such a viscous medium may consist of mineral oil or any suitable machine oil which is transparent to the ruby light. Alternatively, glasses may be used as a host material for the chlorophyll d.

Figure 2:
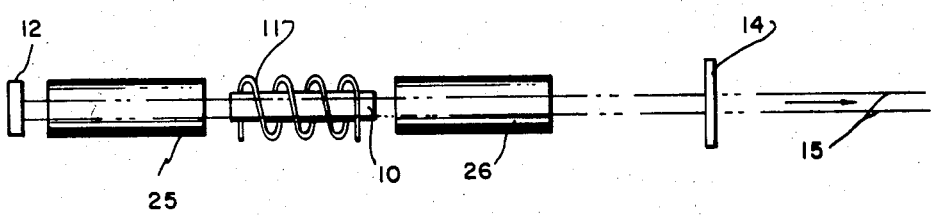
FIG. 2 is a schematic representation of a modified laser in accordance with the present invention having two separate dye cells, but without showing the electronics for triggering the laser.

The second embodiment of the present invention is illustrated in FIG. 2. This again includes a ruby rod 10 with a flash lamp 11, a reflector 12 and an output reflector 14.

In this case, however, a first dye cell 25 is disposed between the reflector 12 and the ruby rod 10, the dye cell 25 and ruby rod 10 occupying approximately ½ of the length of the optical cavity so that the dye cell 25 has a length of at least ¼ that of the optical cavity.

There is also disposed a second dye cell 26 between the ruby rod 10 and the output reflector 14. The second dye cell 26 may have a length of no less than ¼ and approximately ½ that of the optical cavity. The reason for the second dye cell 26 will now be explained. It will be understood that each dye cell 25 and 20 may be replaced by a plurality of dye cells of the same length. It will be understood that each of the dye cells 25 and 26 is filled with chlorophyll d which may be in a viscous solvent such as mineral oil.

This tendency may be minimized if the ruby is placed as in FIG. 2 approximately at the center of the cavity. Additionally, the second dye cell 26 has a high dissipation for unwanted or adjacent modes of the initial mode and therefore counteracts the tendency of the ruby rod to cause mode shifting. A simplified explanation of this phenomenon is that both the ruby rod 10 and the dye cell 26 are located approximately at the center of the cavity and their influences are opposed and hence tend to cancel each other.

For a mathematical analysis of the operation of the dye cells, reference is made to the above-referred to copending application to Heflinger.

In the case of a thin dye cell, it is expected that the image of the object contains range contours. The interval of the range contour is equal to the distance from the dye cell to the 100 percent reflector or submultiples of this distance.

The Heflinger application indicates the importance of the length and position of the dye cell as well as the amount of discrimination which may be expected with a long dye cell in accordance with the present invention. It should be noted that experimental results have confirmed the predictions of theory.

There has thus been disclosed a pulsed ruby laser having improved longitudinal mode control and consequently a much improved coherence length. This is effected by the use of one or more dye cells having a combined length of no less than one-quarter that of the optical cavity but preferably one-half the length of the cavity. The dye cell is filled with chlorophyll *d* which is preferably contained in a viscous solvent such as mineral oil. The chlorophyll *d* has several important properties which provide improved mode control in connection with the ruby laser. Its resonance coincides closely with the lasing line of the ruby laser. Its linewidth is narrow. As a result of its narrow linewidth it has a longer half life of the excited and bleached molecules thereby permitting mode control over a longer period of time on the order of a microsecond. This time period, of course, coincides approximately with the duration of a ruby pulse. It has been found that chlorophyll d in combination with the long dye cell disclosed in the above-referred to Heflinger application permits to produce a ruby laser with a superior coherence.

What is claimed is:

1. A pulsed ruby laser having longitudinal mode control to improve its coherence length, said laser comprising:
   a. a ruby rod;
   b. means for pumping said ruby rod to develop an optical radiation;
   c. a first and a second reflector for reflecting said optical radiation, said reflectors defining an optical resonant cavity and enclosing said ruby rod, said first reflector reflecting substantially all of said optical radiation and said second reflector reflecting only a portion of said optical radiation while transmitting the remainder thereof; and
   d. dye cell means disposed in said cavity and transparent to said optical radiation, said dye cell means containing chlorophyll d operating as a saturable absorber, said dye cell means having a length of no less than one-quarter of that of said resonant cavity.

2. A laser as defined in claim 1 wherein said chlorophyll d is dissolved in a solvent transparent to said optical radiation, said solvent having a high viscosity to minimize the effects of Browian motion.

3. A laser as defined in claim 2 wherein said solvent is a mineral oil.

4. A laser as defined in claim 1 wherein said dye cell means is disposed between said first reflector and said ruby rod.

5. A laser as defined in claim 4 wherein said dye cell means has a length of approximately one-half that of said resonant cavity.

6. A laser as defined in claim 1 wherein said ruby rod is disposed approximately in the middle of said resonant cavity.

* * * * *